United States Patent
Lim et al.

(10) Patent No.: US 10,743,208 B2
(45) Date of Patent: Aug. 11, 2020

(54) POWER SAVING FOR CHANNEL STATE INFORMATION REFERENCE SIGNAL RECEPTION

(71) Applicant: Apple Inc., Cupertino, CA (US)

(72) Inventors: Junsung Lim, San Jose, CA (US); Yuchul Kim, Santa Clara, CA (US); Wei Zeng, San Diego, CA (US); Wei Zhang, Santa Clara, CA (US); Johnson O. Sebeni, Fremont, CA (US); Haitong Sun, Irvine, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/295,431

(22) Filed: Mar. 7, 2019

(65) Prior Publication Data
US 2019/0281546 A1    Sep. 12, 2019

Related U.S. Application Data

(60) Provisional application No. 62/641,555, filed on Mar. 12, 2018.

(51) Int. Cl.
*H04W 24/10* (2009.01)
*H04W 52/02* (2009.01)
(Continued)

(52) U.S. Cl.
CPC .......... *H04W 24/10* (2013.01); *H04L 1/0026* (2013.01); *H04W 52/0216* (2013.01); *H04W 76/28* (2018.02)

(58) Field of Classification Search
CPC . H04W 24/10; H04W 52/0216; H04W 76/28; H04L 1/0026
See application file for complete search history.

(56) References Cited

U.S. PATENT DOCUMENTS

| | | | |
|---|---|---|---|
| 2013/0194990 A1* | 8/2013 | Banister | H04W 24/10 370/311 |
| 2014/0105049 A1* | 4/2014 | Kim | H04W 24/10 370/252 |

(Continued)

OTHER PUBLICATIONS

Ericsson; Beam management in C-DRX 11; 3GPP DRAFT; RI-1802746; 3rd Generation Partnership Project (3GPP); Mobile Competence Centre; 650 Route Des Lucioles, F-06921 Sophia-Antipolis Cedex; France; vol. RAN WG1, no. Athens, Greece; Feb. 17, 2018; 11 pages.

(Continued)

*Primary Examiner* — Kevin C. Harper
(74) *Attorney, Agent, or Firm* — Kowert, Hood, Munyon, Rankin & Goetzel, P.C.

(57) ABSTRACT

A base station and mobile device (UE) may coordinate transmission of reference signals and reception of corresponding channel state information (CSI) reports. If a periodic reference signal is scheduled for transmission outside the on-duration period of the UE, even if the reference signal corresponds to a periodic CSI report scheduled to be transmitted by the UE during the on-duration period, the base station may not transmit the periodic reference signal, thereby allowing the UE not to prematurely exit a low-power state. The base station may instead transmit an aperiodic reference signal at a specified point in time later than the scheduled transmission of the periodic reference signal. The UE may receive the aperiodic reference signal and either transmit the periodic CSI report or an aperiodic CSI report in response, depending on how close to the start of the on-duration period the transmission of the periodic CSI report is scheduled.

20 Claims, 13 Drawing Sheets

(51) Int. Cl.
*H04W 76/28* (2018.01)
*H04L 1/00* (2006.01)

(56) References Cited

U.S. PATENT DOCUMENTS

2016/0128129 A1    5/2016  Kahtava
2017/0126299 A1*   5/2017  Wei .................... H04W 24/10
2018/0242243 A1    8/2018  Kela

OTHER PUBLICATIONS

QUALCOMM et al; "Way forward on UL DCI-Triggered CSIRS resource set for tracking"; 3GPP DRAFT; R1-1803331, 3rd Generation Partnership Project (3GPP), Mobile Competence Centre; 650, Route Des Lucioles, F-06921 Sophia-Antipolis Cedex; France; vol. RAN WG1, no. Athens, Greece; Feb. 28, 2018; eight pages.
Extended European Search Report, European Patent Application No. 19162227.3, dated Jul. 22, 2019, eight pages.
Ericsson, ST-Ericsson; "Periodic CSI and SRS at DRX state change"; Tdoc R2-124636; 3GPP TSG-RAN WG2 #bis; Bratislava, Slovakia; Oct. 8-12, 2012; six pages.
Ericsson (Rapporteur); "Email Discussion Report on CSI/SRS reporting at DRX state change"; Tdoc R2-125628; 3GPP TSG-RAN WG2 #80; New Orleans, Louisiana, USA; Nov. 12-16, 2012; 20 pages.

* cited by examiner

POWER SAVING FOR CHANNEL STATE INFORMATION REFERENCE SIGNAL RECEPTION

PRIORITY CLAIM

This application claims benefit of priority of U.S. Provisional Patent Application Ser. No. 62/641,555 titled "Power Saving for Channel State Information Reference Signal Reception", filed on Mar. 12, 2018, which is hereby incorporated by reference as though fully and completely set forth herein.

FIELD OF THE INVENTION

The present application relates to wireless communications and wireless communication devices, and more particularly to power savings for channel state information reference signal reception in wireless communication devices, e.g. during 5G New Radio (5G-NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices generally powered by a portable power supply, e.g., a battery. Batteries hold a finite charge, and so in order to improve battery life of wireless devices, one approach is to reduce power consumption required to perform wireless communications. One significant consumer of power in a wireless device is transmitter and receiver circuitry (hereinafter 'wireless circuitry' or 'transceiver circuitry') that enables wireless communications. One example of a power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), WiMAX, 5G-NR etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE monitors (receives) downlink (DL) packets following a specified pattern determined by the base station (BS). In idle DRX (I-DRX) mode, the UE monitors for a paging message from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

Many wireless communication standards provide for the use of known signals (e.g., pilot or reference signals) for a variety of purposes, such as synchronization, measurements, equalization, control, etc. For example, in cellular wireless communications, reference signals (RS, for short) represent a special signal that exists only at the physical layer and is not used for delivering any specific information but to deliver a reference point for the downlink power. When a wireless communication device or mobile device (UE) attempts to determine downlink power (e.g. the power of the signal from a base station, such as eNB for LTE and gNB for NR), it measures the power of the reference signal and uses it to determine the downlink cell power. The reference signal also assists the receiver in demodulating the received signals. Since the reference signals include data known to both the transmitter and the receiver, the receiver may use the reference signal to determine/identify various characteristics of the communication channel. This is commonly referred to as 'Channel Estimation', which is a critical part of many high-end wireless communications such as LTE and NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is crucial for achieving reliable communications with high data rates in multi-antenna systems.

A base station may periodically transmit a CSI-RS to a UE to receive a corresponding CSI report from the UE. As mentioned above, C-DRX is a feature that provides an opportunity for a UE to enter a sleep mode in off-durations.

Prematurely awakening a UE that is in sleep mode can become a significant factor in quickly draining the battery of the UE. A CSI-RS occasion (that is, the occasion when the base station transmits a CSI-RS) may not always be in line with the C-DRX on-duration (that is, the time period during a C-DRX mode of operation when the UE is awake). On such occasions the UE is forced to exit sleep mode to perform CSI measurements associated with a CSI-RS time occasion occurring in the off-duration, so that the UE can provide the requisite periodic CSI report during the next on-duration.

Other corresponding issues related to the prior art will become apparent to one skilled in the art after comparing such prior art with the disclosed embodiments as described herein.

SUMMARY OF THE INVENTION

Embodiments described herein relate to a User Equipment (UE) device, base station, and/or relay station, and associated method for preventing the UE from waking up early when an occasion (instance) of a periodically transmitted channel state information reference signal (CSI-RS) occurs while the UE is not in a C-DRX on-duration, for power saving during wireless communications, e.g. during 5G-NR (NR) wireless communications and transmissions.

In some embodiments, a base station (e.g. a gNB) may track the on-duration periods, e.g. C-DRX on-duration periods, of a UE to minimize or eliminate transmitting a CSI-RS by the base station when the UE is in a sleep state or not in a C-DRX on-duration period, thereby preventing the UE from having to additionally wake up (exit a sleep or low-power state) outside the scheduled wake-up periods scheduled for the UE. By coordinating the transmission of CSI-RSs with the UE in this manner, the UE may conserve power by not having to exit the sleep (or low-power) state due to any of the periodically occurring CSI-RSs reaching the UE at a time (or point in time) when the UE is not in an on-duration period, e.g. when the UE is not in a C-DRX on-duration period.

In some embodiments, the base station may operate to configure the timing of the CSI-RS transmissions, expected CSI reports and C-DRX periodicity to coordinate with the UE. If the timing of a current transmission of a periodically transmitted CSI-RS coincides with an on-duration of the UE, e.g. when the UE is not in a sleep/low-power state but is in a C-DRX on-duration period, the base station may transmit the CSI-RS, otherwise the base station may not transmit (suspend) that CSI-RS. The UE may be correspondingly configured to process CSI-RSs, transmit CSI reports, and operate in a C-DRX mode. The UE may then operate as follows. If the timing of the transmission of a current periodically transmitted CSI report transmitted by the UE coincides with an on-duration of the UE, e.g. when the UE is not in a sleep/low-power state but is in a C-DRX on-duration period, and the timing of the transmission of a preceding corresponding CSI-RS also coincides with the on-duration period, then the UE may perform the necessary measurements based on the CSI-RS and transmit the CSI report to the base station. However, if the timing of the transmission of the preceding corresponding CSI-RS does not coincide with the on-duration period, then the UE may suspend, e.g. not transmit a CSI report to the base station. While this solution prevents the UE from having to wake up from a sleep/low-power state outside of the prescribed C-DRX on-duration period, it does not take full advantage of the on-duration, because a CSI report whose transmission timing otherwise coincides with the on-duration is not transmitted by the UE because the transmission timing of the corresponding CSI-RS falls outside the on-duration period.

In some embodiments, the base station may operate to configure the timing of the CSI-RS transmissions, expected CSI reports and C-DRX periodicity to coordinate with the UE. The base station may identify the timing of a first scheduled occurrence of a periodic (e.g. periodically transmitted or periodically scheduled) CSI report that is to be transmitted by the UE during the on-period of the UE. The base station may similarly identify the timing of the scheduled occurrence of a CSI-RS corresponding to the CSI report and to be transmitted by the base station. If the timing of the transmission of the corresponding periodic CSI-RS falls outside the on-duration of the UE, the base station may assign and transmit an aperiodic CSI-RS to the UE at a point in time that coincides with the on-duration of the UE so that the UE may measure the CSI and transmit the periodic CSI report as scheduled without having to exist the low-power or sleep state prematurely. In such a scenario, instead of transmitting a periodically scheduled CSI-RS to the UE, the base station may transmit a "special" aperiodic CSI-RS at a point in time that precedes the transmission of the CSI report by a specified time period (or time threshold) and also coincides with (e.g. falls within) the on-duration of the UE. In this manner, both the transmission of the CSI-RS by the base station and the transmission of the CSI report by the UE coincide with (or take place during) the on-duration of the UE. Optionally, a next scheduled CSI-RS transmission (or a next CSI-RS occasion) whose timing coincides with the on-duration of the UE may be suspended upon the UE having received the aperiodic CSI-RS from the base station. In this case the aperiodic CSI-RS effectively replaces the next scheduled CSI-RS. Consequently, the UE may also suspend (or cancel) the scheduled transmission of the CSI report corresponding to the scheduled CSI-RS transmission that was canceled by the base station due to the transmission of the aperiodic CSI-RS.

In some embodiments, the base station may identify the timing of a first scheduled occurrence of a periodic (e.g. periodically transmitted or periodically scheduled) CSI report that is scheduled to be transmitted by the UE during the on-period of the UE. The base station may identify the timing of the scheduled occurrence of the CSI-RS to be transmitted by the base station and corresponding to the aforementioned CSI report. If the timing of the scheduled periodic CSI-RS (corresponding to the aforementioned CSI report) falls outside the on-duration of the UE, the base station may assign and transmit an aperiodic CSI-RS to the UE at a point in time that precedes the transmission of the corresponding CSI report by a specified time period (or time threshold) even if the timing of the transmission of the CSI-RS does not coincide with (e.g. falls within) the on-duration of the UE, if the specified time period is less than a time period between the scheduled occurrence of a periodic CSI-RS transmitted by the base station and the scheduled occurrence of the corresponding CSI report transmitted by the UE. In this manner, even though the UE may have to exit the low-power or sleep state prematurely, it does not exit that state as early as it would have had to exit the low-power state in order to receive the scheduled occurrence of a periodic CSI-RS transmitted by the base station. Therefore, even though the UE exits the low-power state or sleep state prematurely, the UE still successfully conserves power. Optionally, similar to the previous case, a next scheduled CSI-RS transmission (or a next CSI-RS occasion) whose timing coincides with the on-duration of the UE may be suspended upon the UE having received the aperiodic CSI-RS from the base station, for the same rationale as explained above.

In some embodiments, the base station may operate to configure the timing of the CSI-RS transmissions, expected CSI reports and C-DRX periodicity to coordinate with the UE. The base station may identify the timing of a first scheduled occurrence of a periodic (e.g. periodically transmitted or periodically scheduled) CSI report that is to be transmitted by the UE during the on-period of the UE. If the timing of the aforementioned CSI report corresponds to a point in time that is within a specified time period (or time threshold) of the beginning of the on-duration of the UE, then the base station may not expect to receive that CSI report, and may instead assign and transmit an aperiodic CSI-RS to the UE at a point in time that coincides with the on-duration of the UE and may occur shortly after the UE enters the on-duration, thereby preventing the UE from having to prematurely exit the low-power or sleep state. The UE may then measure the CSI and transmit the CSI report in an aperiodic manner a specified time period (or time threshold) after having received the aperiodic CSI-RS transmitted by the base station. In other words, in such a scenario, instead of transmitting a periodically scheduled CSI-RS to the UE, the base station may transmit a "special" aperiodic CSI-RS at a point in time that coincides with (falls within) the on-duration of the UE and occurs close to the beginning of the on-duration of the UE. Correspondingly, instead of transmitting a periodically scheduled CSI report in correspondence with the aperiodic CSI-RS received from the base station, in this case the UE may transmit an aperiodic CSI report in response to the received aperiodic CSI-RS, a specified time period subsequent to receiving the aperiodic CSI-RS. In this manner, both the transmission of the CSI-RS by the base station and the transmission of the CSI report by the UE coincide with (or take place during) the on-duration of the UE. Optionally, a next scheduled CSI-RS transmission (or a next CSI-RS occasion) whose timing coincides with the on-duration of the UE may be suspended upon the UE having received the aperiodic CSI-RS from the base station, for the same rationale as explained above.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
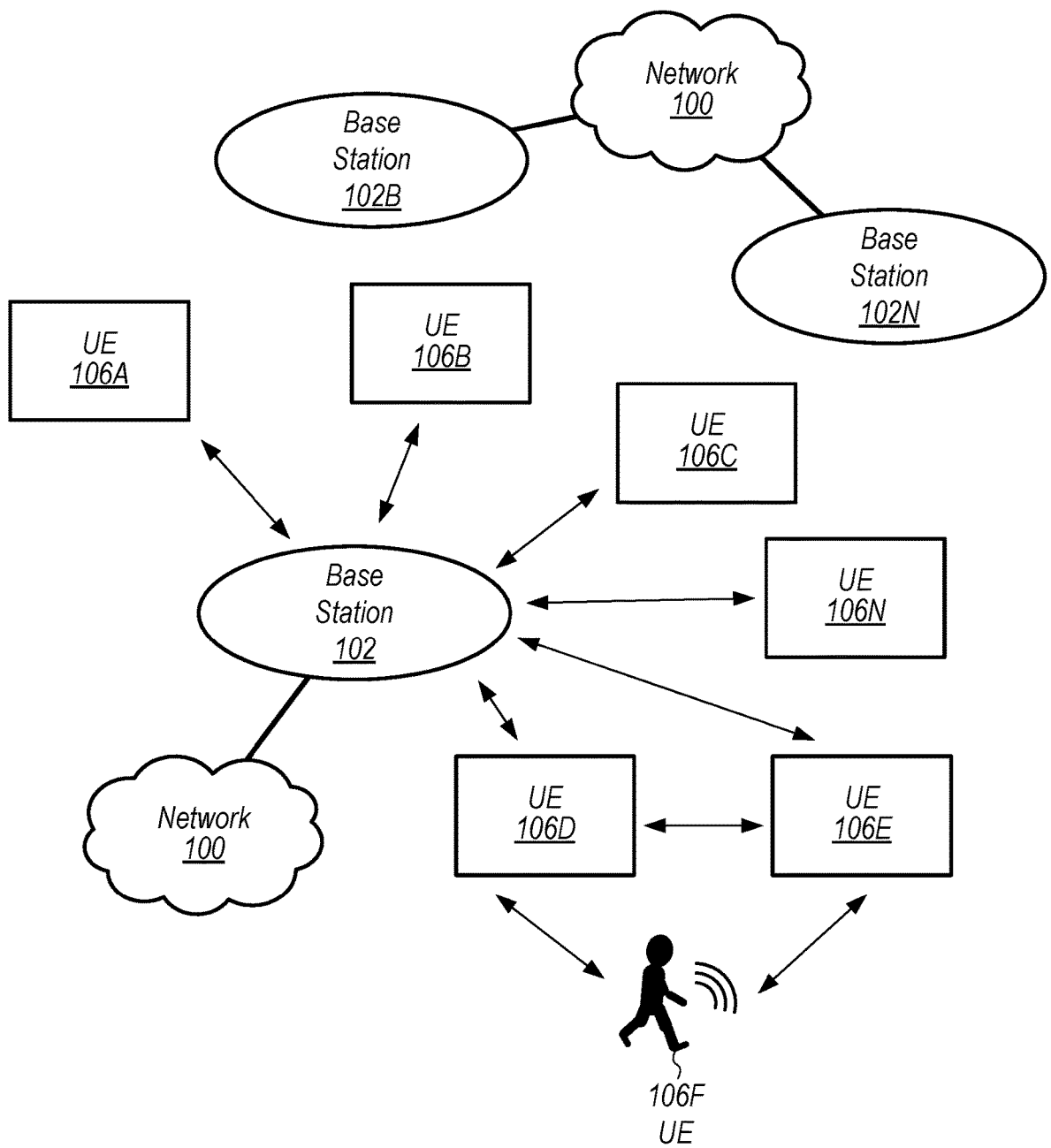
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
ARQ: Automatic Repeat Request (also: Automatic Repeat Query)
BPSK: Binary Phase-Shift Keying
BS: Base Station
CCE: Control Channel Elements
CFI: Control format Indicator
CQI: Channel Quality Indicator
CRC: Cyclic Redundancy Check
DCI: Downlink Control Information
DL: Downlink (from BS to UE)
DL-SCH: Downlink Shared Channel
FDD: Frequency Division Duplexing
FEC: Forward Error Correction
GPS: Global Positioning System
GSM: Global System for Mobile Communication
HARQ: Hybrid Automatic Repeat Request LTE: Long Term Evolution
MAC: Media Access Control (layer)
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
QPSK: Quadrature Phase-Shift Keying
REG: Resource Element Group
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 2:
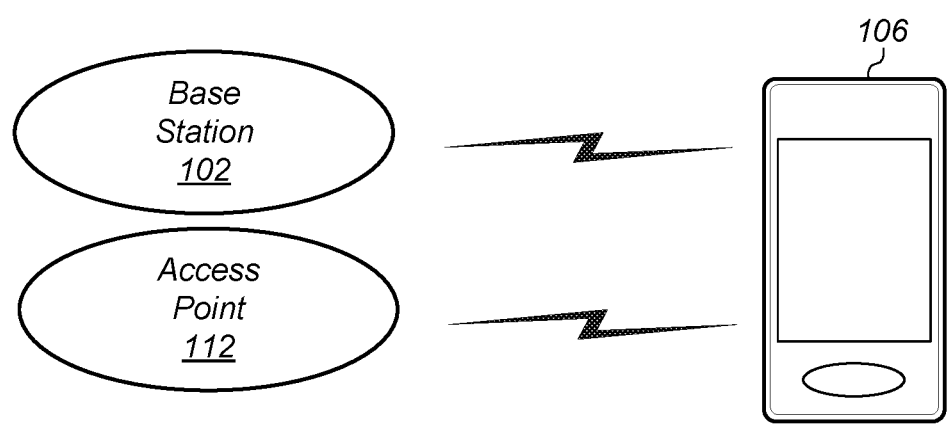
FIG. 2 illustrates an exemplary wireless user equipment (UE) device in communication with an exemplary base station and an exemplary access point, according to some embodiments.

FIGS. 1 and 2—Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE) or UE device. Thus, the user devices 106 are referred to as UEs or UE devices. Various ones of the UE devices may be configured to communicate with base station 102 to receive channel state information reference signals (CSI-RSs) from the base station and transmit CSI reports to the base station during wireless communications, e.g. during 5G-NR communications, according to various embodiments disclosed herein.

The base station 102 may be a base transceiver station (BTS) or cell site, and may include hardware that enables wireless communication with the UEs 106A through 106N. The base station 102 may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 may communicate with at least one UE or a group of UEs by transmitting CSI-RSs to the UE and receiving CSI reports from the UE during wireless communications, e.g. during 5G-NR communications, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 will be discussed below, for example in the context of vehicle-to-everything (V2X) communication such as the communications specified by 3GPP TS 22.185 V.14.3.0, among others.

FIG. 2 illustrates an exemplary user equipment 106 (e.g., one of the devices 106-A through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antenFnas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
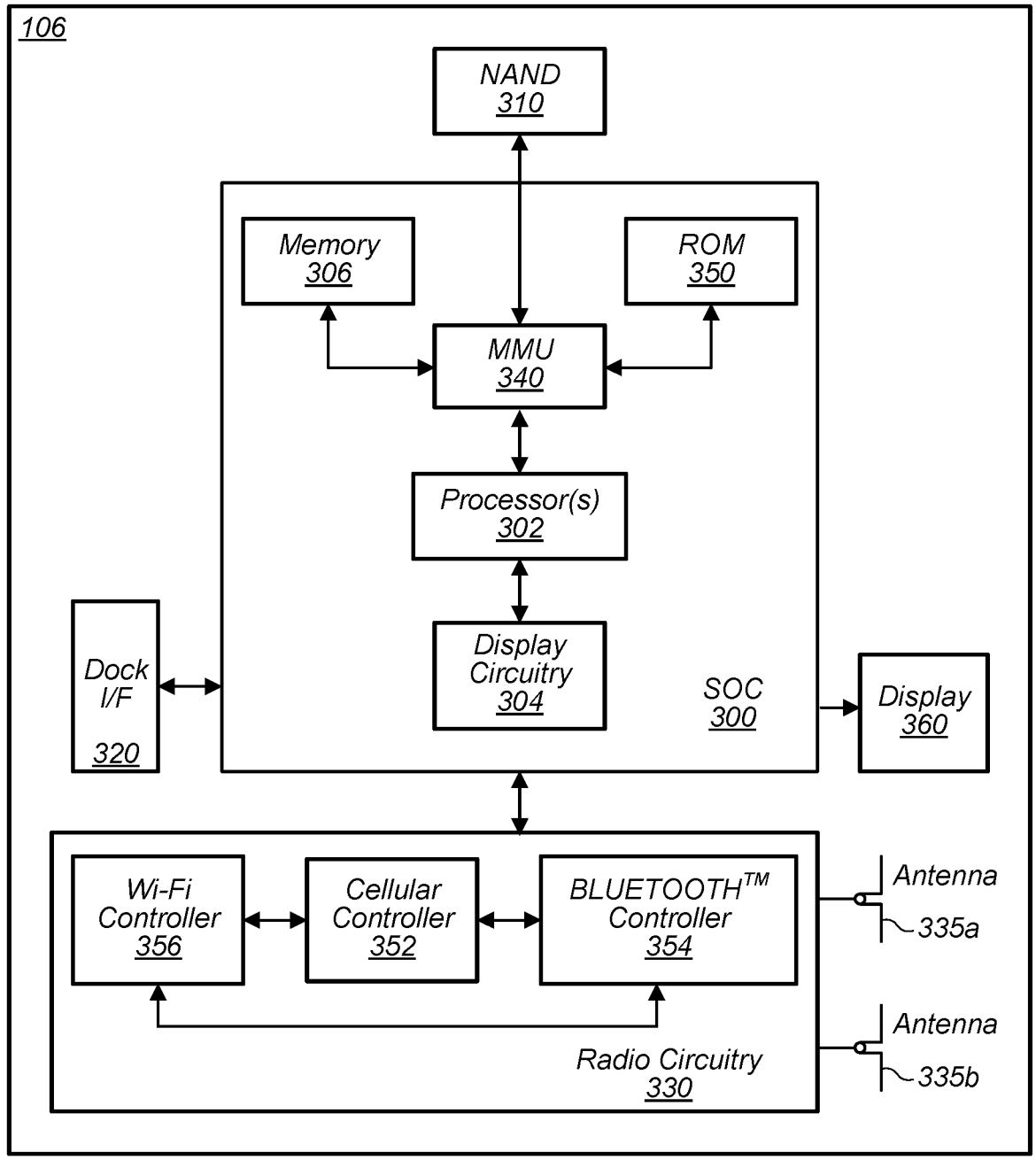
FIG. 3 illustrates an exemplary block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to communicate with base station 102 to receive CSI-RSs from the base station and transmit CSI reports to the base station during wireless communications, e.g. during 5G-NR communications, according to various embodiments detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement receiving CSI-RSs from a base station and transmitting corresponding CSI reports to the base station during wireless communications, e.g. during 5G-NR communications, according to various embodiments disclosed herein. Processor(s) 302 may also implement various other applications and/or end-user applications running on UE 106.

Figure 5:
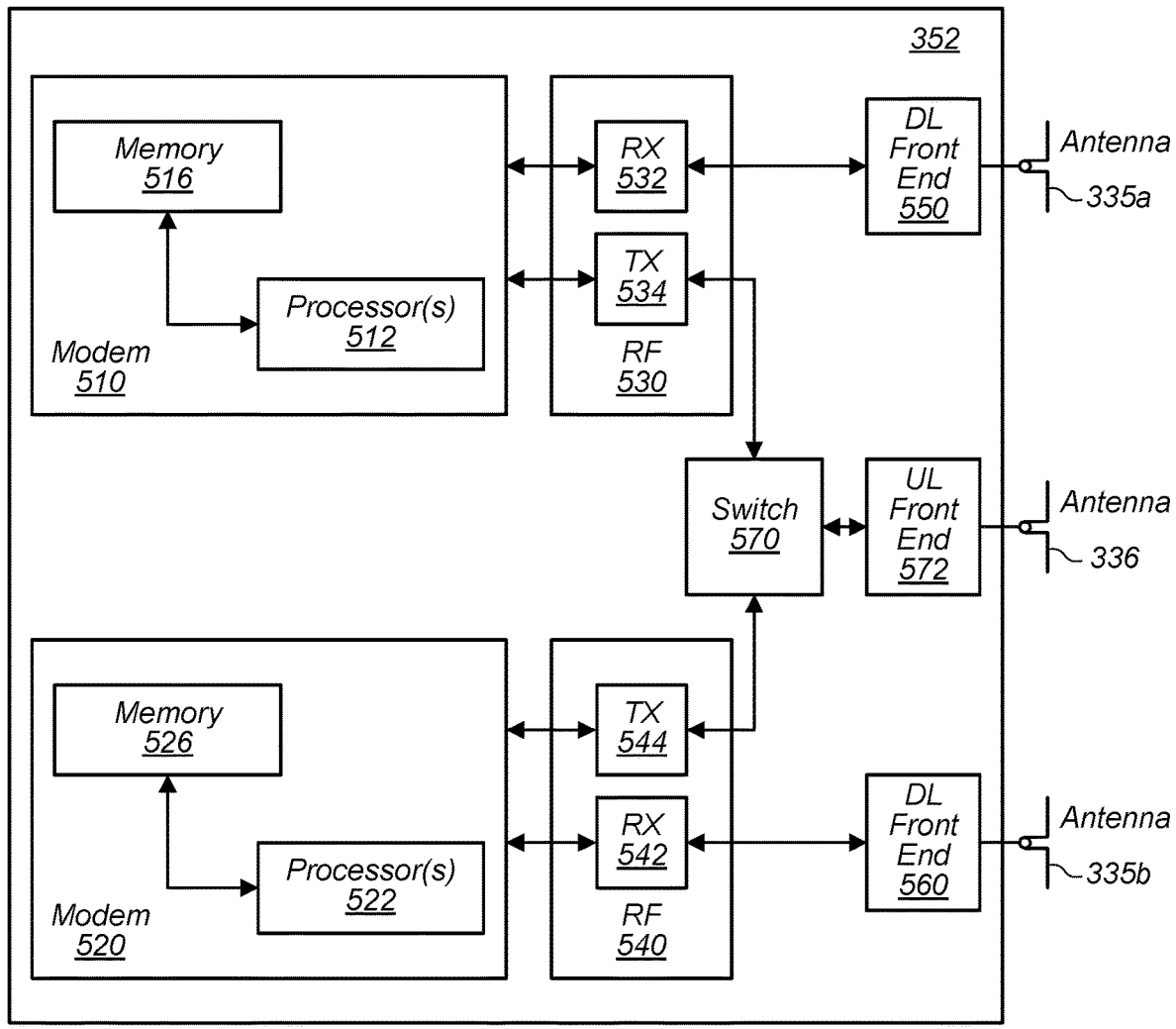
FIG. 5 shows an exemplary simplified block diagram illustrative of cellular communication circuitry, according to some embodiments.
Figure 6:
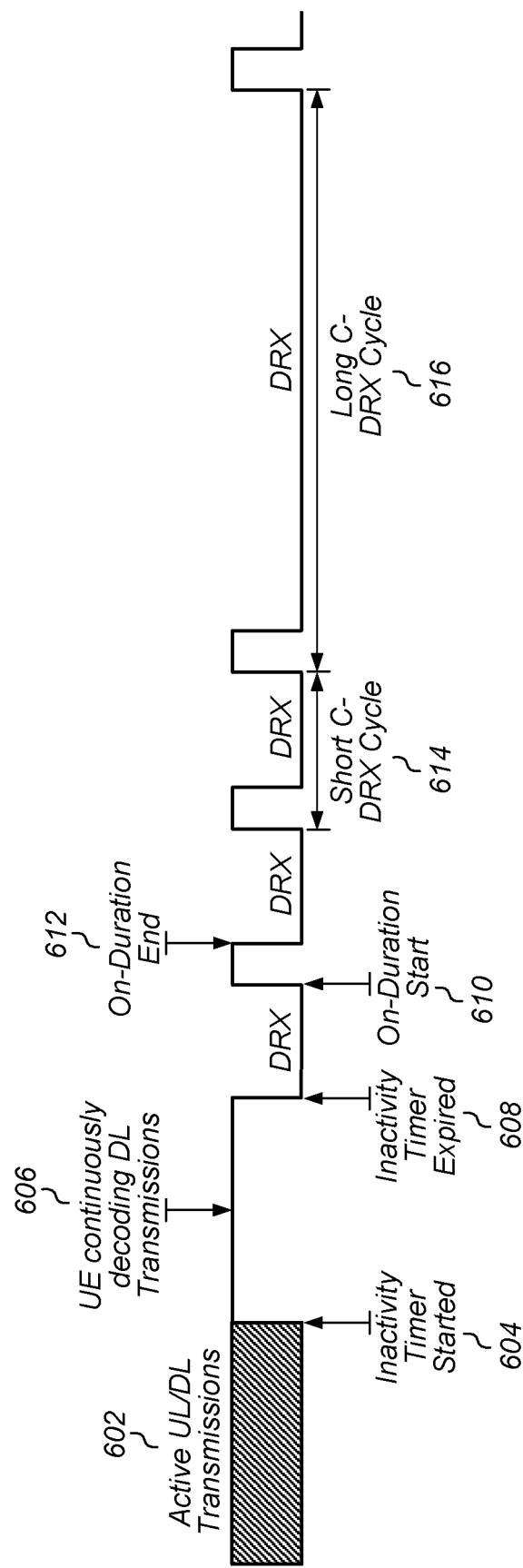
FIG. 6 is an exemplary timing diagram illustrating general operations of a C-DRX capable UE over a period of time.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
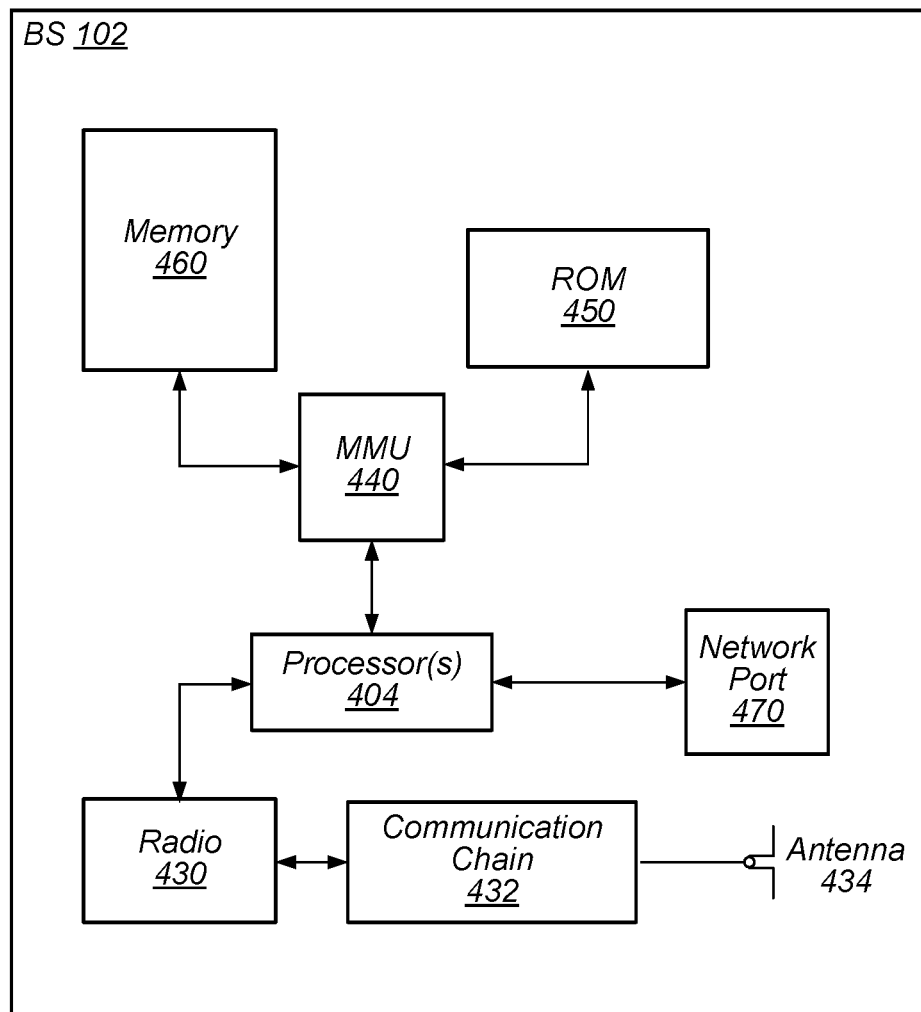
FIG. 4 illustrates an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein for transmitting CSI-RSs to a UE and receiving corresponding CSI reports from the UE, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Overall, the various components (460, 450, 440, 404, 430, 432, 470 and 434) of BS 102 may interoperate to implement at least part or all of the methods described herein for transmitting CSI-RSs to a UE and receiving corresponding CSI reports from the UE in a manner that allows the UE to conserve power and/or reduce power consumption.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335*b*. As another example, the cellular communication circuitry 352 may not include the modem 510, the RF front end 530, the DL front end 550, and/or the antenna 335*a*. In some embodiments, the cellular communication circuitry 352 may also not include the switch 570, and the RF front end 530 or the RF front end 540 may be in communication, e.g., directly, with the UL front end 572.

C-DRX Operating Mode

The parameters for DRX cycles may be configured by the BS through different timers. The DRX inactivity timer indicates the time in number of consecutive subframes to wait before enabling DRX. Short DRX cycles and long DRX cycles are defined to allow the BS to adjust the DRX cycles based on the applications. A DRX short cycle timer may be defined to determine when to transition to the long DRX cycle. When there is no reception of packets for an extended period of time after the successful reception of a packet, the BS may initiate RRC connection release and the UE may enter the RRC IDLE state, during which the idle DRX can be enabled. The On-Duration timer may be used to determine the number of frames over which the UE will read the DL control channel every DRX cycle before entering power saving mode. The allowed values are 1, 2, 3, 4, 5, 6, 8, 10, 20, 30, 40, 50, 60, 80, 100, and 200. During idle DRX mode, the UE may monitor one paging occasion (PO) per DRX cycle, which is one subframe.

FIG. 5 illustrates various aspects of general C-DRX operation. As indicated by 602, the UE 106 may operate in an active state and may perform one or more uplink and/or downlink (UL/DL) transmissions (e.g., transmit uplink data and/or receive downlink data). At 604, an inactivity timer may be initiated. The inactivity timer may be initiated at the end of the active transmissions in 602. Note that the inactivity timer may have been initiated one or more times during the active transmissions in 6502, but may have been reset each time as a result of continuing activity (transmissions) until no more activity was observed at 604, at which point it may run until expiration at 608. The inactivity timer may have any length, as desired; some examples of possible inactivity timer length might include 100 ms, 80 ms, 50 ms, 40 ms, or any other value.

In 606, between initiation (at 604) and expiration (at 608) of the inactivity timer, the UE 106 may not be performing any uplink or downlink transmissions, but may continue to operate in the active state, and may monitor one or more communication channels (e.g., a PDCCH) for downlink grants. At 608, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 610, the UE 106 may "wake-up" and re-enter the active state. The UE 106 may wake up at a time specified by a schedule, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP 36.331 specification; alternatively, the on-duration may last until certain functions have been performed, and may end when no further specified functions need to be performed. At 612, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 614 (which may last 20 ms, 40 ms, 80 ms, or any other length of time), and if no uplink or downlink transmission are performed by the end of the pre-determined number of cycles, the UE 106 may perform one or more "long C-DRX" cycles 616 (which may last 80 ms, 160 ms, 320 ms, or any other length of time, e.g., as specified by 3GPP 36.331), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles. If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

Transmission and Reception of CSI-RSs and Corresponding CSI reports

Figure 7:
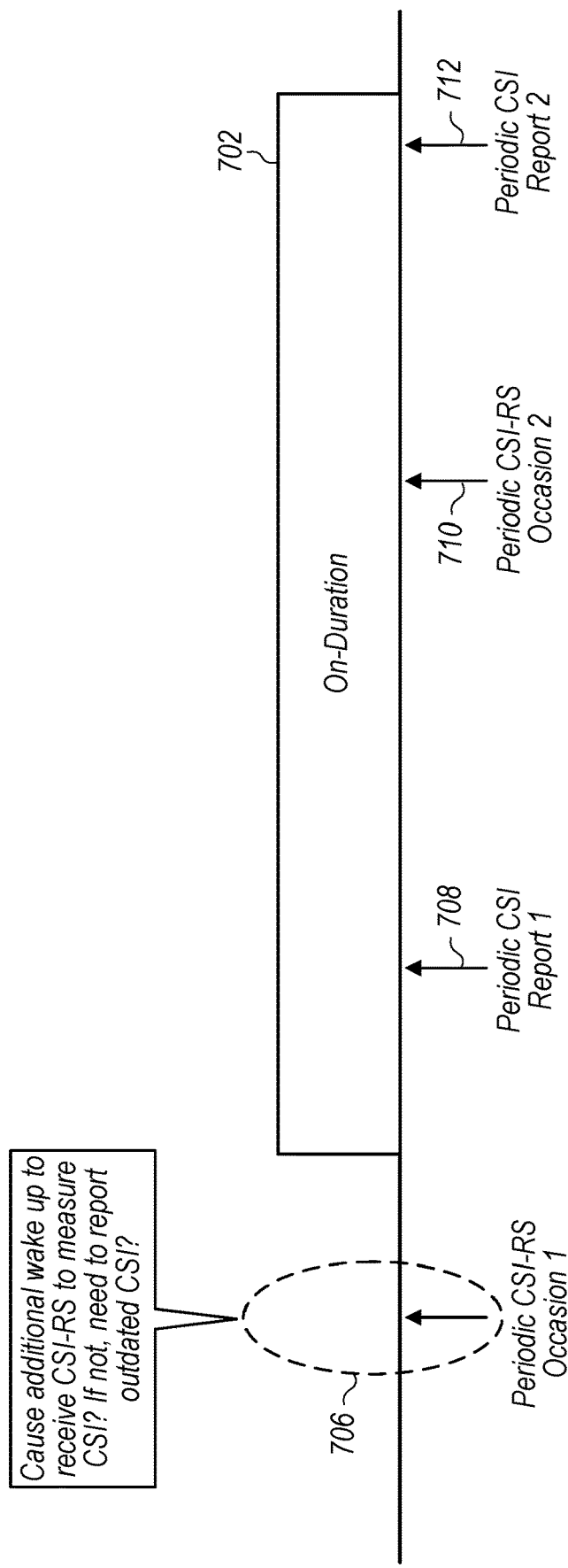
FIG. 7 shows an exemplary timing diagram illustrating a periodic CSI-RS transmission occurring outside of the C-DRX on-duration period of a UE.

As previously mentioned, a base station may periodically transmit (e.g. according to a determined schedule) a CSI-RS (channel state information reference signal) to a UE, and subsequently receive a corresponding periodic CSI report from the UE. Because C-DRX is a feature that provides an opportunity for a UE to enter a sleep mode during off-durations, prematurely awakening a UE from a low-power (or lower-power) state may precipitate draining the battery of the UE. A CSI-RS occasion, that is, a point in time when the base station transmits a periodic CSI-RS (e.g., a scheduled CSI-RS) may not always coincide with or may not always fall within the C-DRX on-duration period, even though the corresponding CSI report may have been scheduled to be transmitted by the UE during the on-duration period. To put it another way, there may be cases when upon entering the on-duration period, there is a periodic CSI report scheduled to be transmitted (by the UE) during that on-duration period prior to the UE receiving any scheduled periodic CSI-RSs during that on-duration period. Such a scenario may simply be inevitable when scheduling CSI-RS transmissions and CSI report transmissions for a C-DRX mode of operation. This is illustrated in FIG. 7, which shows a periodic CSI-RS (at periodic CSI-RS occasion 1) 706 transmitted by the base station outside the on-duration 702 of the UE, with the UE scheduled to transmit a (corresponding) periodic CSI report (Periodic CSI report 1) 708 after having entered the on-duration period 702, prior to receiving a CSI-RS during that on-duration period.

In the event of the above scenario, in current systems, the UE may either prematurely exit the low-power state or remain in the low-power state until the start of the scheduled on-duration period 702. In case the UE prematurely exits the low-power state, it receives the RS 706, makes the appropriate measurements, and transmits a corresponding up-to-date, scheduled periodic CSI report (CSI report 1) 708. While CSI report 708 is up-to-date, prematurely exiting the low-power state results in additional power use and a faster draining of the power source (e.g. battery) of the UE. FIG. 7 also illustrates the UE receiving an RS (at periodic CSI-RS occasion 2) 710, and transmitting a corresponding CSI report (periodic CSI report 2) 712, both during the on-duration period 702. In case the UE remains in the low-power state (it does not prematurely exit the low-power/sleep state), the UE will still transmit the CSI report 708 during the on-duration period 702, but in such a case, CSI report 708 may not contain up-to-date information and may therefore not provide accurate information to the base station. Accordingly, neither of these options is desirable. In order to avoid the issues highlighted above, the base station and UE may operate to coordinate the transmission and reception of CSI-RSs and corresponding CSI reports to facilitate power savings in the UE while still transmitting up-to-date CSI reports to the base station.

Figure 8:
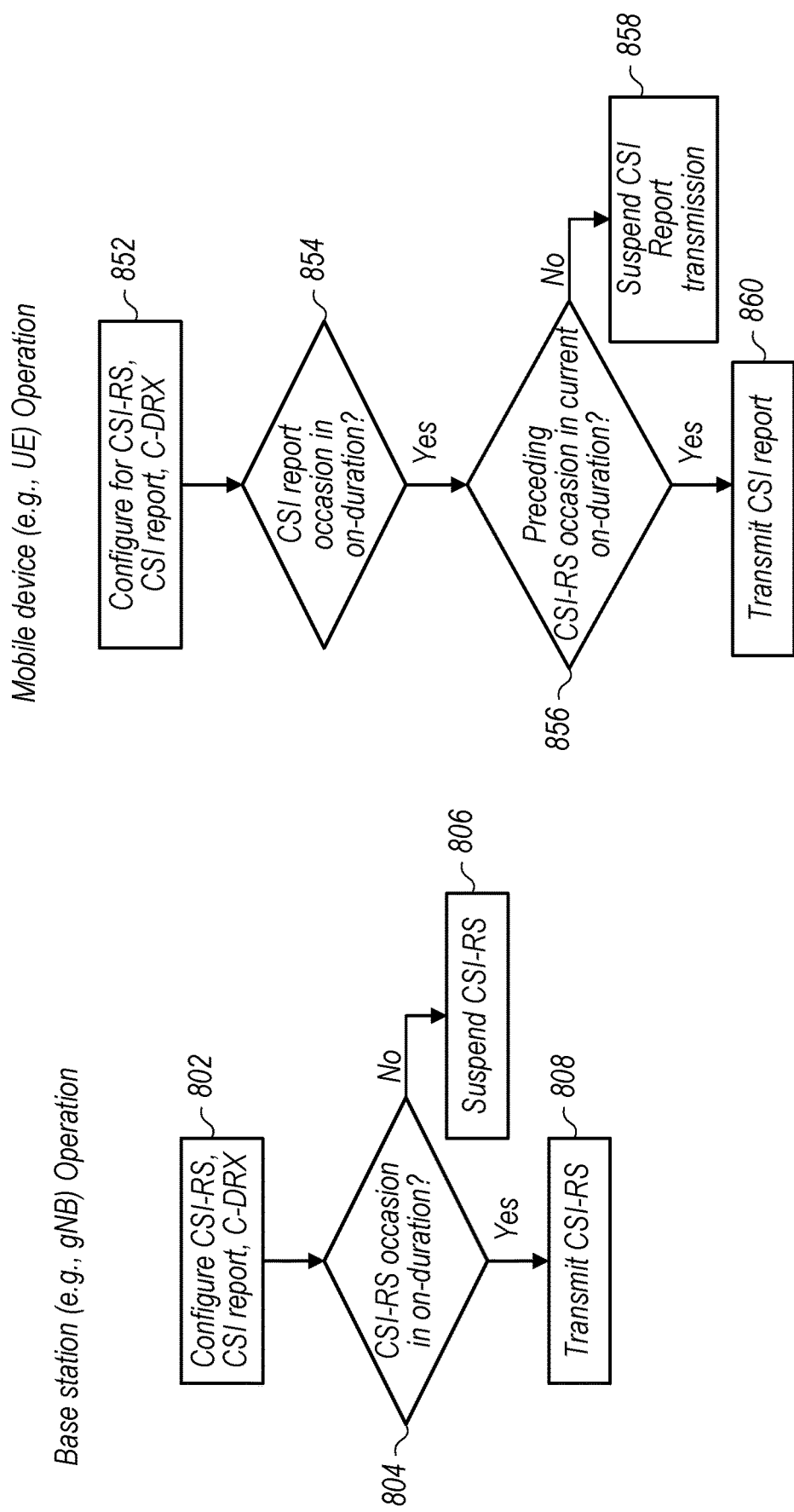
FIG. 8 shows an exemplary flow diagram illustrating cooperation of a base station and a UE that allows the UE no to receive a periodic CSI-RS occasion outside the C-DRX on-duration while still transmitting up-to-date CSI reports, according to some embodiments.
Figure 9:
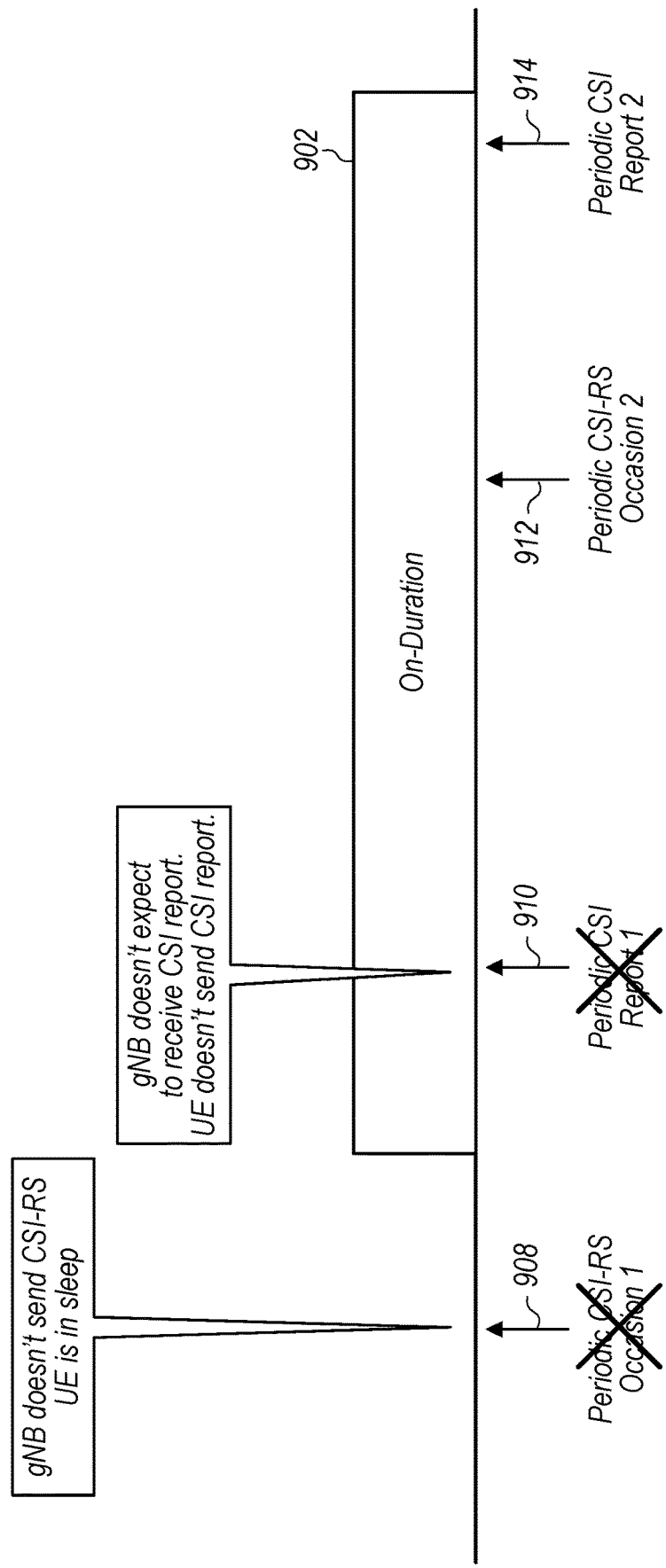
FIG. 9 shows an exemplary timeline diagram illustrating the operation of the base station and the UE corresponding to the flow diagram of FIG. 7.

FIGS. 8 and 9

FIG. 8 shows an exemplary flow diagram illustrating how a base station and a device (e.g. UE) may coordinate the transmission/reception of CSI-RSs and CSI reports to allow the UE not to prematurely exit a low-power/sleep state to receive a periodic CSI-RS occasion outside the C-DRX on-duration while also ensuring that the CSI reports transmitted by the UE to the base station are up-to-date, according to some embodiments. As shown in FIG. 7, the base station may configure the timing of the CSI-RS transmissions, expected CSI reports and C-DRX periodicity (802). If the timing of a current transmission of a periodically transmitted CSI-RS coincides with (is within) an on-duration of the UE, e.g. when the UE is not in a sleep/low-power state but is in a C-DRX on-duration period ("Yes" at 804), the base station may transmit the CSI-RS (808). Otherwise ("No" at 804), the base station may not transmit (or suspend) the scheduled periodic CSI-RS (806). The UE may be correspondingly configured to process CSI-RSs, transmit CSI reports, and operate in a C-DRX mode (852). The UE may then operate as follows. If the timing of the transmission of a current periodically transmitted CSI report transmitted by the UE coincides with an on-duration of the UE, e.g. when the UE is not in a sleep/low-power state but is in a C-DRX on-duration period ("Yes" at 854), and the timing of the transmission of a preceding corresponding CSI-RS also coincides with the on-duration period ("Yes" at 856), then the UE may perform the necessary measurements based on the CSI-RS and transmit the CSI report to the base station (860). However, if the timing of the transmission of the preceding corresponding CSI-RS does not coincide with the on-duration period ("No" at 856), then the UE may suspend, e.g. not transmit a CSI report to the base station (858).

The above scenario is also illustrated in the timeline shown in FIG. 9. As also illustrated in FIG. 9, the timing of a next periodic CSI-RS 912 (at periodic CSI-RS occasion 2) may fall within the on-duration 902 of the UE, along with the timing of the corresponding periodic CSI report 914 (CSI report 2) transmitted by the UE. Since both of those occurrences fall within the on-duration 902 of the UE, they may take place as scheduled, at least in part compensating for the UE not transmitting the first periodic CSI report 910 (CSI report 1), which would have been transmitted in response to periodic CSI-RS 908 (at periodic CSI-RS occasion 1). While this solution prevents the UE from having to wake up from a sleep/low-power state outside of the prescribed C-DRX on-duration period, it does not take full advantage of the on-duration, because a CSI report whose transmission timing otherwise coincides with the on-duration (e.g. periodic CSI report 910) is not transmitted by the UE due to the transmission timing of the corresponding CSI-RS (908) falling outside the on-duration period 902.

Figure 10:
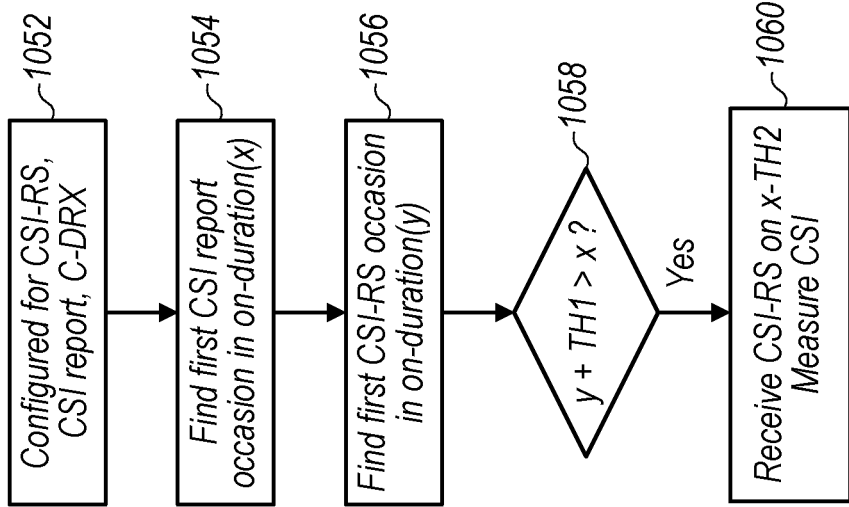
FIG. 10 shows an exemplary flow diagram illustrating cooperation of a base station and a UE to transmit and receive aperiodic CSI-RSs and in some cases aperiodic CSI reports, according to some embodiments.
Figure 10:
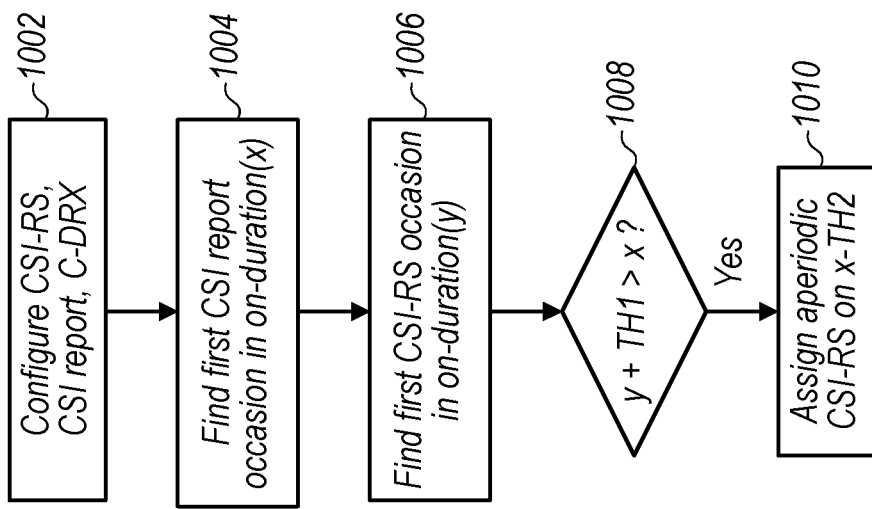
Figure 11:
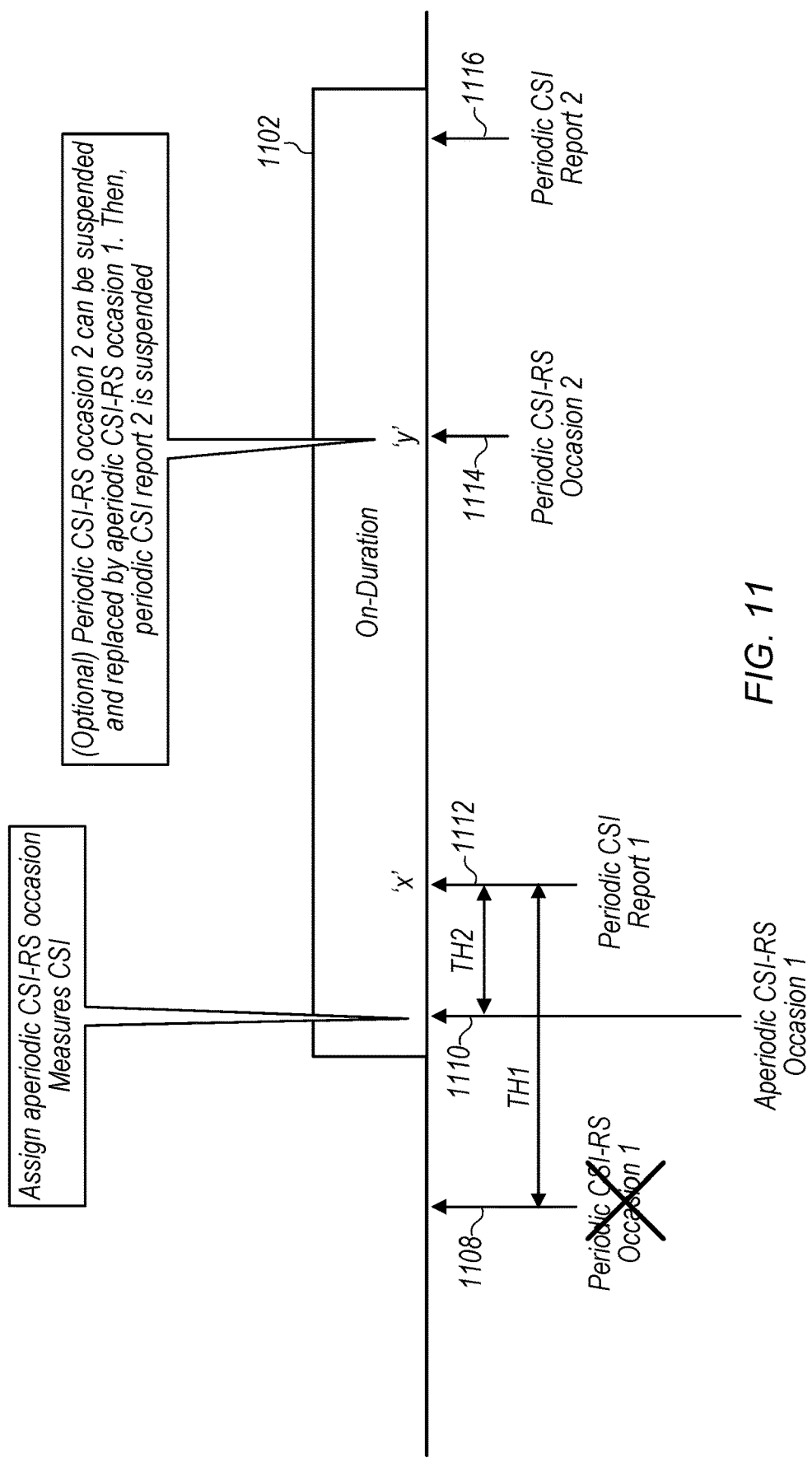
FIG. 11 shows an exemplary timeline diagram illustrating the operation of the base station and the UE corresponding to the flow diagram of FIG. 9, according to some embodiments.

FIGS. 10 and 11

FIG. 10 shows an exemplary flow diagram illustrating cooperation of a base station and a UE to transmit and receive aperiodic CSI-RSs and in some cases aperiodic CSI reports, according to some embodiments. As shown in FIG. 10, in some embodiments, the base station may operate to configure the timing of the CSI-RS transmissions, expected CSI reports and C-DRX periodicity to coordinate with the UE (1002). The base station may identify the timing of a first scheduled occurrence of a periodic (e.g. periodically transmitted or periodically scheduled) CSI report that is to be transmitted by the UE during the on-period of the UE (1004). For example, the base station may identify a time 'x' when a first CSI report is scheduled to be transmitted after the UE enters a C-DRX on-duration period. The base station may similarly identify the timing (for example, a time 'y') of the first periodic CSI-RS to be transmitted by the base station during the on-duration (1006). The base station may determine whether the aforementioned CSI report corresponds to the aforementioned CSI-RS by evaluating the relative positions of time x and time y with respect to a specified time period, e.g. TH1, by which transmission of the CSI-RS may be expected to precede transmission of the corresponding CSI report, (1008). If the determination indicates that timing of the transmission of the scheduled periodic CSI-RS corresponding to the CSI report (the point in time that precedes the transmission time x of the CSI report by the specified time period, e.g. TH1) falls outside the on-duration of the UE ("Yes" at 1008), the base station may assign and transmit an aperiodic CSI-RS to the UE at a point in time ('x-TH2') that coincides with (falls within) the on-duration of the UE (1010). This enables the UE to measure the CSI and transmit the CSI report as scheduled without having to exit the low-power or sleep state prematurely. In such a scenario, instead of transmitting a periodically scheduled CSI-RS to the UE, the base station may transmit a "special" aperiodic CSI-RS at a point in time that precedes the transmission (at time 'x') of the scheduled periodic CSI report by a specified time period (or time threshold, e.g. TH2) and also coincides with (e.g. falls within) the on-duration of the UE. In this manner, both the transmission of the CSI-RS by the base station and the transmission of the scheduled periodic CSI report by the UE coincide with (or take place during) the on-duration of the UE. Consequently, as also shown in FIG. 10, the UE may also be aware of (identify) the respective timings of the transmission of the CSI report and the transmission of the CSI-RS, and receive and recognize the aperiodic CSI-RS transmitted by the base station, perform the necessary measurements, and transmit the corresponding periodic CSI report as scheduled. While not shown in FIG. 10, if the timing of the transmission of the scheduled periodic CSI-RS corresponding to the CSI report does not fall outside the on-duration of the UE (at 1008), the base station may simply transmit a corresponding periodic (e.g. scheduled CSI-RS) during the UE on-duration.

The UE may be correspondingly configured to process CSI-RSs, transmit CSI reports, and operate in a C-DRX mode (1052). The UE may also identify the timing of a first scheduled occurrence of a periodic (e.g. periodically transmitted or periodically scheduled) CSI report that is to be transmitted by the UE during the on-period of the UE (1054). For example, the UE may identify a time 'x' when a first CSI report is scheduled to be transmitted after the UE enters a C-DRX on-duration period (1054). The UE may similarly identify the timing (for example, a time 'y') of the first periodic CSI-RS to be transmitted by the base station during the on-duration (1056). The UE may determine whether the aforementioned CSI report corresponds to the aforementioned CSI-RS by evaluating the relative positions of time x and time y with respect to the specified time period, e.g. TH1, by which transmission of the CSI-RS may be expected to precede transmission of the corresponding CSI report (1058). If the determination indicates that the timing of the transmission of the scheduled periodic CSI-RS corresponding to the CSI report (the point in time that precedes the transmission time x of the CSI report by the specified time period, e.g. TH1) falls outside the on-duration of the UE ("Yes" at 1058), the UE may receive the aperiodic CSI-RS transmitted by the base station to the UE at a point in time ('x-TH2') that coincides with (falls within) the on-duration of the UE, and may measure the CSI accordingly (1060).

FIG. 11 shows an exemplary timeline diagram illustrating the operation of the base station and the UE corresponding to the flow diagram of FIG. 10, according to some embodiments. The base station may identify the timing (indicated as time 'x', or point in time 'x'), of a first scheduled occurrence of a periodic (e.g. periodically transmitted or periodically scheduled) CSI report 1112 that is to be transmitted by the UE during the on-period 1102 of the UE. For example, the base station may identify when a first CSI report is scheduled to be transmitted after the UE enters a C-DRX on-duration period 1102. The base station may similarly identify the timing of the periodic CSI-RS 1108 to be transmitted by the base station and corresponding to CSI report 1112. When the timing of the transmission of the scheduled periodic CSI-RS 1108 corresponding to the CSI report 1112 falls outside the on-duration 1102 as illustrated (for example when the point in time 'y' of the first occurrence of a periodic CSI-RS report in the on-duration 1102 is greater than 'x−TH1', as described above with respect to FIG. 10), the base station may assign and transmit an aperiodic CSI-RS 1110 to the UE at a point in time (indicated as 'x−TH2', as mentioned above with respect to FIG. 10) that coincides with (falls within) the on-duration 1102 of the UE.

As also illustrated in FIG. 11, the timing of a next periodic CSI-RS (at occasion 2) 1114 may fall within the on-duration 1102 of the UE (and also represents the first periodic CSI-RS occasion within the on-duration 1102), along with the timing of the corresponding periodic CSI report (CSI report 2) 1116 transmitted by the UE. Although both of those occurrences fall within the on-duration 1102 of the UE, they may optionally be suspended by the base station and the UE, respectively. Since the UE received the aperiodic CSI-RS 1110 (at aperiodic CSI-RS occasion 1) and transmitted the periodic CSI report 1112, the aperiodic CSI-RS 1110 may effectively replace the next scheduled CSI-RS 1114 (at periodic CSI-RS occasion 2). Consequently, the UE may also suspend (or cancel) the scheduled transmission of the CSI report 1116 (periodic CSI report 2) corresponding to the scheduled CSI-RS transmission that was canceled by the base station due to the transmission of the aperiodic CSI-RS 1110.

There may be variations of the basic method illustrated in FIGS. 10 and 11. At least two variations are discussed below with respect to FIG. 12 and FIG. 13. It should be noted, that while FIG. 10 applies to the variations shown in FIGS. 11 and 12, FIG. 13 is illustrative of a scenario in which the periodic scheduled CSI report is not transmitted in favor of an aperiodic CSI report, in which case scheduling of the aperiodic CSI-RS is determined with respect to that aperiodic CSI report and not with respect to the periodic scheduled CSI report, as will be further detailed below.

FIG. 12

Figure 12:
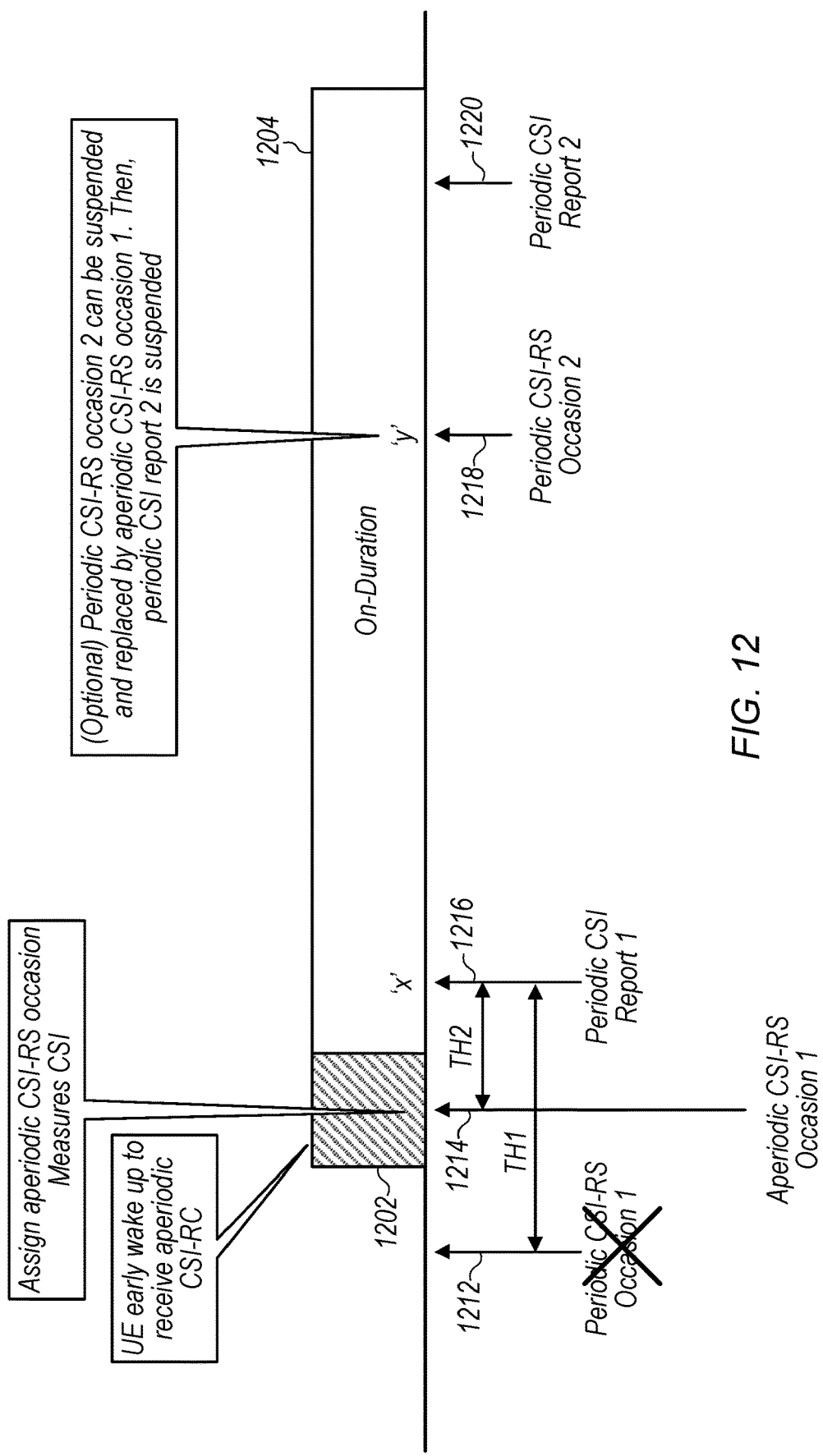
FIG. 12 shows an exemplary timeline diagram illustrating operation of a base station and a UE corresponding to the flow diagram of FIG. 9, with the UE prematurely exiting from the low-power state, according to some embodiments.
Figure 13:
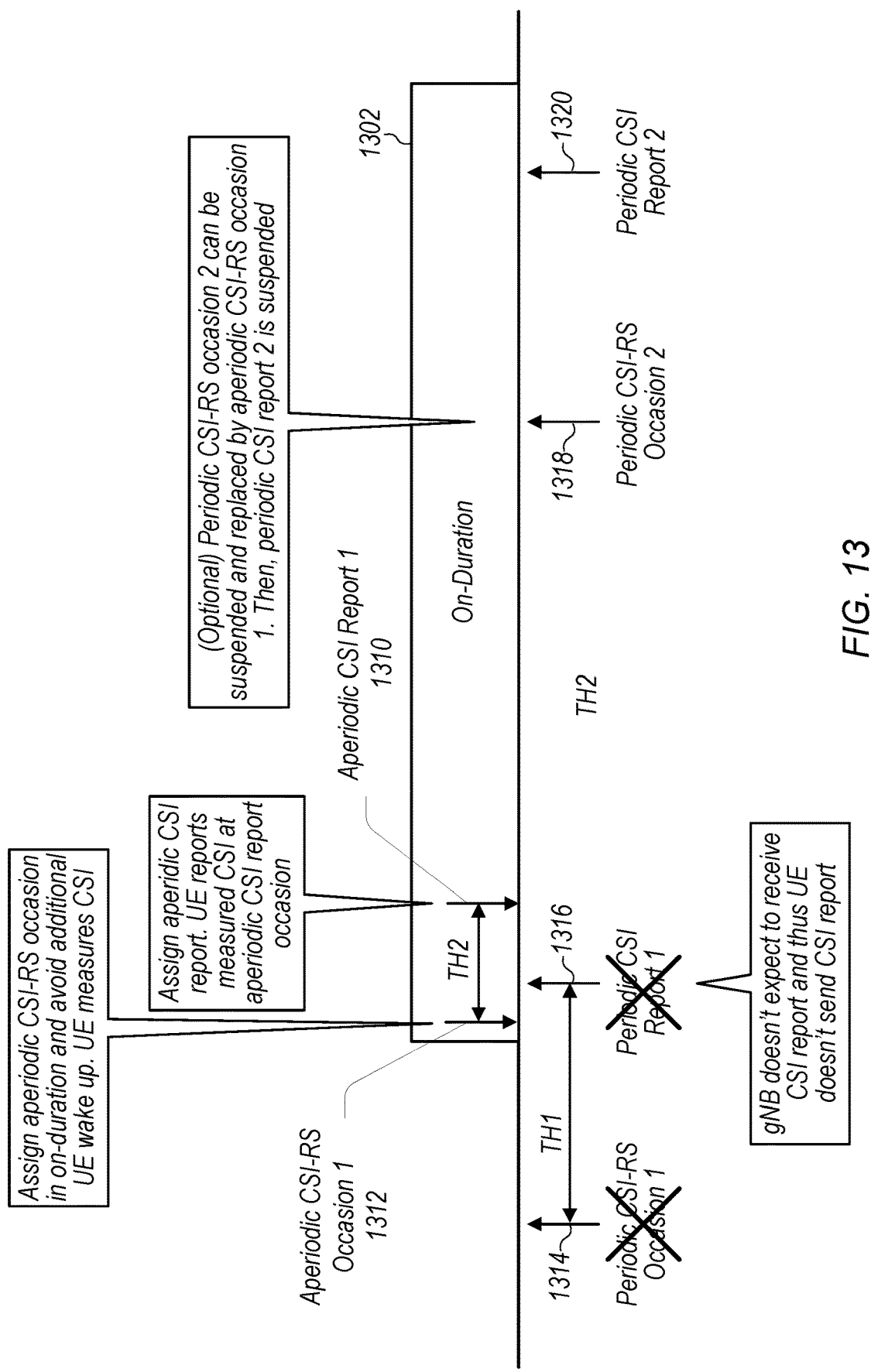
FIG. 13 shows an exemplary timeline diagram illustrating operation of a base station and a UE corresponding to the flow diagram of FIG. 9, with the UE transmitting an aperiodic CSI report, according to some embodiments.

FIG. 12 shows an exemplary timeline diagram illustrating operation of a base station and a UE corresponding to the flow diagram of FIG. 10, with the UE prematurely exiting from the low-power state to measure an aperiodic CSI-RS, according to some embodiments. As shown in FIG. 12, if the timing of the transmission of the scheduled periodic CSI-RS 1212 corresponding to the periodic CSI report 1216 (periodic CSI report 1) falls outside the on-duration 1204 of the UE (for example when the point in time 'y' of the first occurrence of a periodic CSI-RS report in the on-duration 1204 is greater than 'x−TH1', as described above with respect to FIG. 10), the base station may assign and transmit an aperiodic CSI-RS 1214 (at aperiodic CSI-RS occasion 1) to the UE at a point in time (indicated as 'x−TH2', as mentioned above with respect to FIG. 10) that precedes the transmission of the corresponding periodic CSI report 1216 by a specified time period (TH2) even if the timing of the transmission of the CSI-RS 1216 falls outside the on-duration 1204 of the UE, provided that the specified time period is less than the time period (for example, TH1, as mentioned with respect to FIG. 10) between the scheduled occurrence of a periodic CSI-RS 1212 (at periodic CSI-RS occasion 1) transmitted by the base station and the scheduled occurrence of the corresponding periodic CSI report 1216 (periodic CSI report 1) transmitted by the UE. That is, TH2 is less than the time between periodic CSI-RS 1212 and periodic CSI report 1216, for example, TH2 is less than TH1. In this manner, even though the UE may have to exit the low-power or sleep state prematurely, as indicated by shaded region 1202 in FIG. 12, it does not exit that state as early as it would have to exit in order to receive the scheduled occurrence of periodic CSI-RS 1212 (at periodic CSI-RS occasion 1) transmitted by the base station. Therefore, even though the UE may exit the low-power state or sleep state prematurely, the UE still successfully conserves power.

As also illustrated in FIG. 12, and similar to the previous case shown in FIG. 11, the timing of a next periodic CSI-RS 1218 (at periodic CSI-RS occasion 2) may fall within the on-duration 1204 of the UE (and also represents the first periodic CSI-RS occasion within the on-duration 1204), along with the timing of the corresponding periodic CSI report 1220 (periodic CSI report 2) transmitted by the UE. Although both of those occurrences fall within the on-duration 1204 of the UE, they may optionally be suspended by the base station and the UE, respectively. Since the UE received the aperiodic CSI-RS 1214 and transmitted the periodic CSI report 1216, the aperiodic CSI-RS 1214 may effectively replace the next scheduled CSI-RS 1218. Consequently, the UE may also suspend (or cancel) the scheduled transmission of the CSI report 1220 corresponding to the scheduled CSI-RS 1218 transmission that was canceled by the base station due to the transmission of the aperiodic CSI-RS 1214.

FIG. 13

FIG. 13 shows an exemplary timeline diagram illustrating operation of a base station and a UE, with the UE transmitting an aperiodic CSI report instead of a scheduled periodic CSI report, according to some embodiments. In the example illustrated in FIG. 13, the aperiodic CSI-RS may be scheduled with respect to the aperiodic CSI report. As shown in FIG. 13, if the timing of a first scheduled occurrence of a periodic (e.g. periodically transmitted or periodically scheduled) CSI report 1316 that is to be transmitted by the UE during the on-period 1302 of the UE corresponds to a point in time that is within a specified time period (or time threshold) of the beginning of the on-duration 1302 of the UE, then the base station may operate not to expect to receive CSI report 1316, and the UE may not transmit the periodic CSI 1316. As illustrated in FIG. 13, transmission of the periodic CSI report 1316 is scheduled too close to the beginning of the on-duration period 1302 of the UE, and the base station therefore doesn't expect to receive periodic CSI report 1316, and may also not transmit periodic CSI-RS 1314. Instead, the base station may assign and transmit an aperiodic CSI-RS 1312 to the UE at a point in time that coincides with the on-duration 1302 of the UE and may occur shortly after the UE enters the on-duration 1302 (at aperiodic CSI-RS occasion 1), thereby preventing the UE from having to prematurely exit the low-power or sleep state. The UE may then measure the CSI and transmit a CSI report 1310 (aperiodic CSI report 1) in an aperiodic manner a specified time period (TH2) after having received the aperiodic CSI-RS 1312 transmitted by the base station. In other words, in such a scenario, instead of transmitting a periodically scheduled CSI-RS 1314 to the UE, the base station may transmit a "special" aperiodic CSI-RS 1312 at a point in time that falls within the on-duration 1302 of the UE and occurs close to the beginning of the on-duration 1302 of the UE, for example within a specified time of the beginning of the on-duration 1302 of the UE. Correspondingly, instead of transmitting a periodically scheduled CSI report 1316 in correspondence with the aperiodic CSI-RS 1312 received from the base station, in this case the UE transmits an aperiodic CSI report 1310 in response to the received aperiodic CSI-RS 1312, a specified time period subsequent to receiving the aperiodic CSI-RS 1312. In this manner, both the transmission of the CSI-RS by the base station and the transmission of the CSI report by the UE take place during the on-duration of the UE without the UE having to prematurely exit the low-power state.

As also illustrated in FIG. 13, and similar to the previous cases shown in FIG. 11 and FIG. 12, the timing of a next periodic CSI-RS 1318 (at periodic CSI-RS occasion 2) may fall within the on-duration 1302 of the UE, along with the timing of the corresponding periodic CSI report 1320 transmitted by the UE. Although both of those occurrences fall within the on-duration 1302 of the UE, they may optionally be suspended by the base station and the UE, respectively. Since the UE received the aperiodic CSI-RS 1312 and transmitted the aperiodic CSI report 1310, the aperiodic CSI-RS 1312 may effectively replace the next scheduled CSI-RS (periodic CSI-RS 1318). Consequently, the UE may also suspend (or cancel) the scheduled transmission of the CSI report 1320 corresponding to the scheduled CSI-RS transmission 1318 that was canceled by the base station due to the transmission of the aperiodic CSI-RS 1312.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a memory element configured to store information; and
a processing element configured to use at least a portion of the information to cause a device to:
identify whether transmission of a periodic channel state information (CSI) reference signal is scheduled to take place during an on-duration period of the device, wherein the periodic CSI reference signal corresponds to a periodic CSI report whose transmission by the device is scheduled to take place during the on-duration period; and
in response to identifying that the transmission of the periodic CSI reference signal is scheduled to take place outside the on-duration period:
remain in a low-power state; and
do not transmit the periodic CSI report during the on-duration period.

2. The apparatus of claim 1, wherein the processing element is configured to further cause the device to:
in response to identifying that the transmission of the periodic CSI reference signal is scheduled to take place during the on-duration period:
receive the periodic CSI reference signal; and
transmit the periodic CSI report, during the on-duration period, in response to receiving the CSI reference signal.

3. The apparatus of claim 2, wherein the processing element is configured to further cause the device to receive the periodic CSI reference signal from a base station.

4. The apparatus of claim 1, wherein the processing element is configured to further cause the device to:
receive an aperiodic CSI reference signal during the on-duration period, wherein the aperiodic CSI reference signal is transmitted instead of the periodic CSI reference signal in response to a determination that the transmission of the periodic CSI reference signal is scheduled to take place outside the on-duration period; and
transmit the periodic CSI report during the on-duration period, in response to receiving the aperiodic CSI reference signal.

5. The apparatus of claim 4, wherein the aperiodic CSI reference signal is transmitted at a later point in time than a point in time for which the transmission of the periodic CSI reference signal is scheduled.

6. The apparatus of claim 1, wherein the processing element is configured to further cause the device to:
exit the low-power state prior to a previously specified starting time of the on-duration period, to receive an aperiodic CSI reference signal, wherein the aperiodic CSI reference signal is transmitted instead of the periodic CSI reference signal in response to a determination that the transmission of the periodic CSI reference signal is scheduled to take place outside the on-duration period; and
transmit the periodic CSI report, during the on-duration period, in response to receiving the aperiodic CSI reference signal.

7. The apparatus of claim 6, wherein the processing element is configured to further cause the device to:
receive the aperiodic CSI reference signal at a specified point in time preceding a point in time for which the transmission of the periodic CSI report is scheduled.

8. The apparatus of claim 1, wherein the processing element is configured to further cause the device to:
receive an aperiodic CSI reference signal during the on-duration period, wherein the aperiodic CSI reference signal is transmitted instead of the periodic CSI reference signal in response to a determination that the transmission of the periodic CSI reference signal is scheduled to take place outside the on-duration period; and
transmit a corresponding aperiodic CSI report instead of the periodic CSI report during the on-duration period, in response to receiving the aperiodic CSI reference signal.

9. The apparatus of claim 8, wherein the processing element is configured to further cause the device to:
transmit the aperiodic CSI report instead of the periodic CSI report at least partially in response to a determination that the periodic CSI report is scheduled to be transmitted at no later than a specified point in time subsequent to a start of the on-duration period.

10. The apparatus of claim 8, wherein the processing element is configured to further cause the device to:
transmit the aperiodic CSI report at no later than a specified point in time subsequent to when the aperiodic CSI reference signal was received.

11. A device comprising:
radio circuitry configured to facilitate wireless communications of the device; and
a processing element communicatively coupled to the radio circuitry and configured to:
identify whether transmission of a periodic channel state information (CSI) reference signal is scheduled to take place during an on-duration period of a wireless communication device, wherein the periodic CSI reference signal corresponds to a periodic CSI report scheduled to be transmitted by the wireless communication device during the on-duration period; and
do not transmit the periodic CSI reference signal in response to identifying that the transmission of the periodic CSI reference signal is scheduled to take place outside the on-duration period.

12. The device of claim 11, wherein the processing element is further configured to:
transmit an aperiodic CSI reference signal to the wireless communication device during the on-duration period, at a later point in time than a point in time for which the transmission of the periodic CSI reference signal is scheduled, in response to identifying that the transmission of the periodic CSI reference signal is scheduled to take place outside the on-duration period; and receive the periodic CSI report from the wireless communication device during the on-duration period, wherein the periodic CSI report is transmitted in response to the aperiodic CSI reference signal.

13. The device of claim 11, wherein the processing element is further configured to:

transmit an aperiodic CSI reference signal to the wireless communication device during the on-duration period, in response to identifying that the transmission of the periodic CSI reference signal is scheduled to take place outside the on-duration period; and receive a corresponding aperiodic CSI report instead of the periodic CSI report during the on-duration period, at no later than a point in time subsequent to transmitting the aperiodic CSI reference signal, wherein the aperiodic CSI report is transmitted in response to the aperiodic CSI reference signal.

14. A non-transitory memory element storing instructions executable by a processing element to cause a device to:

identify whether transmission of a periodic channel state information (CSI) reference signal is scheduled to take place during an on-duration period of the device, wherein the periodic CSI reference signal corresponds to a periodic CSI report whose transmission by the device is scheduled to take place during the on-duration period; and in response to identifying that the transmission of the periodic CSI reference signal is scheduled to take place outside the on-duration period:
  remain in a low-power state; and
  do not transmit the periodic CSI report during the on-duration period.

15. The non-transitory memory element of claim 14, wherein the instructions are executable by the processing element to further cause the device to:

in response to identifying that the transmission of the periodic CSI reference signal is scheduled to take place during the on-duration period:
  receive the periodic CSI reference signal; and
  transmit the periodic CSI report, during the on-duration period, in response to receiving the CSI reference signal.

16. The non-transitory memory element of claim 14, wherein the instructions are executable by the processing element to further cause the device to:

receive an aperiodic CSI reference signal during the on-duration period, wherein the aperiodic CSI reference signal is transmitted instead of the periodic CSI reference signal in response to a determination that the transmission of the periodic CSI reference signal is scheduled to take place outside the on-duration period; and transmit the periodic CSI report during the on-duration period, in response to receiving the aperiodic CSI reference signal.

17. The non-transitory memory element of claim 14, wherein the instructions are executable by the processing element to further cause the device to:

exit the low-power state prior to a previously specified starting time of the on-duration period, to receive an aperiodic CSI reference signal, wherein the aperiodic CSI reference signal is transmitted instead of the periodic CSI reference signal in response to a determination that the transmission of the periodic CSI reference signal is scheduled to take place outside the on-duration period; and transmit the periodic CSI report, during the on-duration period, in response to receiving the aperiodic CSI reference signal.

18. The non-transitory memory element of claim 14, wherein the instructions are executable by the processing element to further cause the device to:

receive an aperiodic CSI reference signal during the on-duration period, wherein the aperiodic CSI reference signal is transmitted instead of the periodic CSI reference signal in response to a determination that the transmission of the periodic CSI reference signal is scheduled to take place outside the on-duration period; and transmit a corresponding aperiodic CSI report instead of the periodic CSI report during the on-duration period, in response to receiving the aperiodic CSI reference signal.

19. The non-transitory memory element of claim 18, wherein the instructions are executable by the processing element to further cause the device to:

transmit the aperiodic CSI report instead of the periodic CSI report at least partially in response to a determination that the periodic CSI report is scheduled to be transmitted at no later than a specified point in time subsequent to a start of the on-duration period.

20. The non-transitory memory element of claim 18, wherein the instructions are executable by the processing element to further cause the device to:

transmit the aperiodic CSI report at no later than a specified point in time subsequent to when the aperiodic CSI reference signal was received.

* * * * *